United States Patent
Lee et al.

(10) Patent No.: US 8,159,741 B2
(45) Date of Patent: Apr. 17, 2012

(54) ELECTRONIC PAPER DISPLAY DEVICE AND MANUFACTURING METHOD THEREOF

(75) Inventors: Hwan-Soo Lee, Seoul (KR); Yongsoo Oh, Seongnam-si (KR); Sang-Moon Lee, Seoul (KR); Jeong-Bok Kwak, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 91 days.

(21) Appl. No.: 12/544,524

(22) Filed: Aug. 20, 2009

(65) Prior Publication Data
US 2010/0047528 A1  Feb. 25, 2010

(30) Foreign Application Priority Data

Aug. 22, 2008 (KR) .................. 10-2008-0082344
Apr. 10, 2009 (KR) .................. 10-2009-0031193

(51) Int. Cl.
*G02B 26/00* (2006.01)
*G03G 17/04* (2006.01)
*G09G 3/34* (2006.01)
*G02F 1/133* (2006.01)

(52) U.S. Cl. ............. 359/296; 430/32; 345/107; 349/33
(58) Field of Classification Search .................. 359/296; 430/31–32; 345/107; 349/33
See application file for complete search history.

(56) References Cited

U.S. PATENT DOCUMENTS

| 6,741,386 | B2* | 5/2004 | Minami | 359/296 |
| 7,391,555 | B2* | 6/2008 | Albert et al. | 359/296 |
| 2003/0030884 | A1* | 2/2003 | Minami | 359/296 |
| 2004/0145562 | A1* | 7/2004 | Horikiri | 345/107 |
| 2007/0120095 | A1* | 5/2007 | Gruner | 252/500 |
| 2007/0268244 | A1* | 11/2007 | Chopra et al. | 345/107 |
| 2009/0180172 | A1* | 7/2009 | Murakami | 359/296 |

FOREIGN PATENT DOCUMENTS

| JP | 2002-258329 | 9/2002 |
| JP | 2005-182043 | 7/2005 |
| JP | 2007-310402 | 11/2007 |
| KR | 10-0616132 | 8/2006 |

OTHER PUBLICATIONS

Korean Office Action, with Partial English Translation, issued in Korean Patent Application No. 10-2009-0031193, dated Dec. 16, 2010.

* cited by examiner

*Primary Examiner* — Dawayne A Pinkney
(74) *Attorney, Agent, or Firm* — McDermott Will & Emery LLP

(57) ABSTRACT

An electronic paper display device and a method of manufacturing the electronic paper display device are disclosed. The method can include forming a plurality of relievo patterns on a lower board, in which the relievo patterns are formed to be independent and separated from one another, disposing a display unit in between the plurality of relievo patterns, and attaching an upper board on the plurality of relievo patterns such that the display unit is covered. In accordance with an embodiment of the present invention, the method can improve the freedom of disposing the display units by allowing partition walls to form only at areas to fix the display units.

12 Claims, 18 Drawing Sheets

ELECTRONIC PAPER DISPLAY DEVICE AND MANUFACTURING METHOD THEREOF

CROSS-REFERENCE TO RELATED APPLICATIONS

This application claims the benefit of Korean Patent Application Nos. 10-2008-0082344 and 10-2009-0031193, filed with the Korean Intellectual Property Office on Aug. 22, 2008 and Apr. 10, 2009, respectively, the disclosure of which is incorporated herein by reference in their entirety.

BACKGROUND

1. Technical Field

The present invention relates to an electronic paper display device and a method of manufacturing the electronic paper display device.

2. Description of the Related Art

Great changes are required today in ways of transmitting and sharing information, in correspondence with a new paradigm that is required in the information society. To meet this, the development of flexible electronic paper, which is also called e-paper, has been accelerated and has entered an initial stage of commercial development.

E-paper is much cheaper in production cost than the conventional flat panel display. Since e-paper does not use a backlight to illuminate its pixels, and does not need to be recharged constantly, it can have superior energy efficiency, while running at very low energy. Moreover, e-paper is very clear, has wider viewing angles, and is capable of holding text and images indefinitely without electricity.

Due to such advantages described above, e-paper may indeed have a variety of applications and have an enormous market potential. Applications may include e-books that have a paper-like surface and are capable of displaying digital versions of books, e-paper magazines with moving illustrations, self-updating newspapers, reusable paper displays for mobile phones, disposable TV screens and electronic wallpapers.

E-paper can be realized through several different methods, including an LCD, an organic EL, a reflective film display, electrophoresis, a twist ball, an electro-chromic method and a mechanically reflective display.

In the twist ball and electrophoresis methods, display units are interposed between an upper board and a lower board. Here, uniform placement of the display units is an important factor in determining the quality of displayed images. Accordingly, a number of studies are underway to develop a technology for disposing the display units uniformly and easily.

SUMMARY

The present invention provides an electronic paper display device and a method of manufacturing the electronic paper display device that can implement uniform placement of display units by improving the freedom of disposing the display units.

An aspect of the present invention provides a method of manufacturing an electronic paper display device. In accordance with an embodiment of the present invention, the method includes forming a plurality of relievo patterns in a lower board, in which the relievo patterns are formed to be independent and separated from one another, disposing a display unit in between the plurality of relievo patterns, and attaching an upper board on the plurality of relievo patterns such that the display unit is covered.

The display unit can be a capsule including a positively-charged (+) particle and a negatively-charged (−) particle dispersed in a fluid liquid. Here, the height of the relievo patterns is smaller than the height of the capsule. Moreover, one of the (+) particle and (−) particle can be a black particle made from carbon black and the other of the (+) particle and (−) particle can be a white particle made from titanium oxide.

The display unit can be a rotating body having optical and electrical anisotropy.

The forming of the plurality of relievo patterns can include stacking a resin layer on an upper surface of the lower board, and pressing a stamp on the resin layer, in which the stamp has intaglio patterns formed therein and the intaglio patterns correspond to the relievo patterns. The cross section of the relievo patterns can be any one of a cross shape, a Y shape, a rectangular shape and a circular shape.

The relievo patterns can be made of a material selected from a group consisting of polycarbonates (PC), polyethylene terephthalate (PET), polyethersulfone (PES), polyimide, an epoxy system, a urethane system and a polyester system.

Another aspect of the present invention provides an electronic paper display device. In accordance with an embodiment of the present invention, the electronic paper display device includes a lower board, a plurality of relievo patterns, which are formed on the lower board, and which are formed to be independent and separated from one another, a display unit, which is disposed in between the plurality of relievo patterns such that the display unit is separated from an adjacent display unit, and an upper board, which is stacked on the plurality of relievo patterns such that the display unit is covered.

The display unit can be a capsule including a positively-charged (+) particle and a negatively-charged (−) particle dispersed in a fluid liquid. Here, one of the (+) particle and (−) particle can be a black particle made from carbon black and the other of the (+) particle and (−) particle can be a white particle made from titanium oxide. The display unit can be a rotating body having optical and electrical anisotropy.

The cross section of the relievo patterns can be any one of a cross shape, a Y shape, a rectangular shape and a circular shape. The relievo patterns can be made of a material selected from a group consisting of polycarbonates (PC), polyethylene terephthalate (PET), polyethersulfone (PES), polyimide, an epoxy system, a urethane system and a polyester system.

Additional aspects and advantages of the present invention will be set forth in part in the description which follows, and in part will be obvious from the description, or may be learned by practice of the invention.

DETAILED DESCRIPTION

Figure 1:
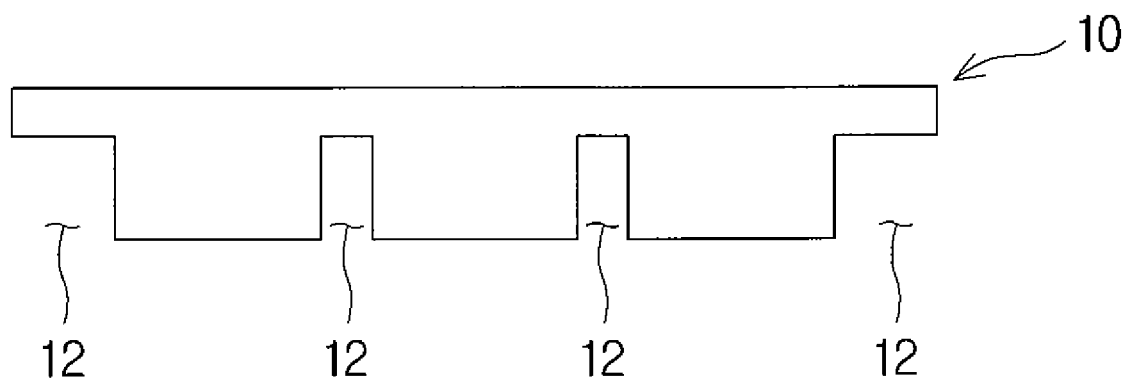
FIGS. 1 to 6 are flow diagrams illustrating a method of manufacturing an electronic paper display device in accordance with an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

An electronic paper display device and a method of manufacturing the electronic paper display device according to certain embodiments of the present invention will be described below in more detail with reference to the accompanying drawings. Those components that are the same or are in correspondence are rendered the same reference numeral regardless of the figure number, and redundant explanations are omitted.

FIGS. 1 to 6 are flow diagrams illustrating a method of manufacturing an electronic paper display device in accordance with an embodiment of the present invention, and FIGS. 7 to 15 illustrate certain embodiments of the present invention.

Illustrated in FIGS. 1 to 14 are a stamp 10, intaglio patterns 12, a lower board 20, a resin layer 30, relievo patterns 32, 33, 34, 36 and 37, capsules 40 and an upper board 70.

In accordance with an embodiment of the present invention, a method of manufacturing an electronic paper display device can include forming a plurality of relievo patterns on a lower board in such a way that the relievo patterns are independent and separated from one another, disposing display units in between the plurality of relievo patterns, and attaching an upper board on the plurality of relievo patterns such that the display unit is covered. The method allows partition walls to form only at areas to fix the display units, thereby facilitating the placement of the display units and producing the partition walls more easily.

First of all, a method of manufacturing an electronic paper display device will be described with reference to FIGS. 1 to 6.

First, as illustrated in FIG. 1, a stamp 10 having intaglio patterns 12 formed therein is prepared. Here, the stamp 10 having the intaglio patterns 12 formed therein may be coated with a self-assembled monolayer (SAM). By forming a coating layer (not illustrated) on the intaglio patterns 12 by coating the self-assembled monolayer (SAM), the intaglio patterns 12 of the stamp 10 and the resin layer 30 can be easily separated from each other after the intaglio patterns 12 of the stamp 10 and the resin layer 30 are pressed against each other.

Figure 2:
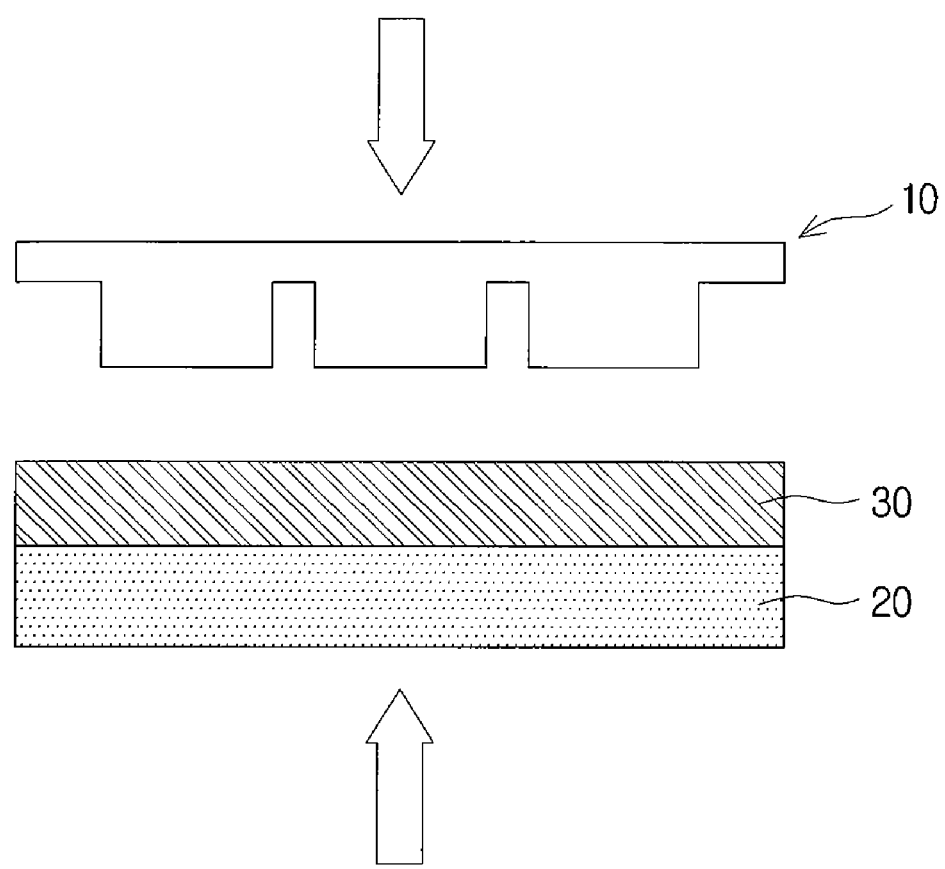
Figure 3:
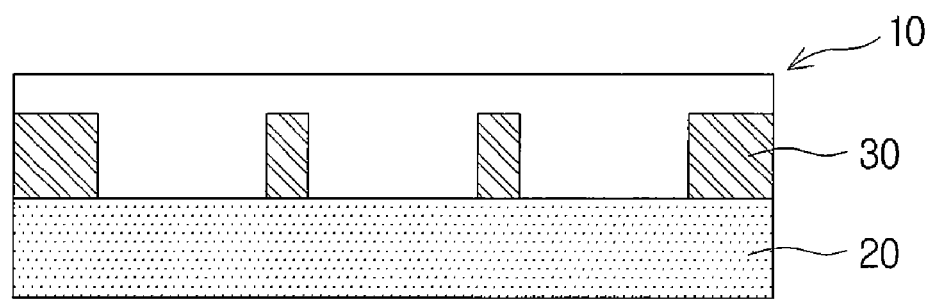
Figure 4:
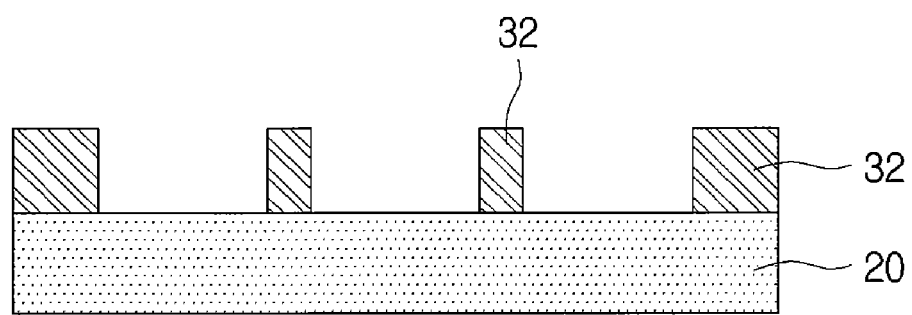

After that, the resin layer 30 is stacked on a lower board 20 (refer to FIG. 2). Then, the stamp 10 having the intaglio patterns 12 is pressed against the resin layer 30 (refer to FIG. 3), so that relievo patterns 32 corresponding to the intaglio patterns 12 can be formed by removing the stamp 10 (refer to FIG. 4). Here, the relievo patterns 32 formed on the lower board 20 are configured to be independent and separated from one another.

Meanwhile, a thermosetting epoxy material can be used as the resin layer 30. In this case, an imprinting process can be divided into two-step processes such that the relievo patterns 32 can be formed more efficiently.

For example, the stamp 10 and the resin layer 30 can be thermo-pressed for 30 minutes within a range of temperatures in which the viscosity of the resin layer 30 is the lowest, for example, about 100° C., and then while maintaining the stamp 10 and the resin layer 30 compressed together, the resin layer 30 can be hardened by increasing the temperature up to a temperature range in which the resin layer 30 can be hardened, for example, about 180° C. After these processes, the stamp 10 and the resin layer 30 can be separated from each other.

When using this method described above, the intaglio patterns 12 formed in the stamp 10 can be copied on the resin layer 30 more efficiently. Upon or after removing the stamp 10 from the resin layer 30, the shape of patterns copied on the resin layer 30 can be maintained efficiently.

While this embodiment presents the imprinting method using the stamp 10 for forming partition walls, i.e., the relievo patterns 32, it shall be apparent that the present invention is not limited to this method, and there can be other various methods, for example, a dry type or wet type etching method, to form the relievo patterns 32.

The lower board 20 and an upper board 70, which will be described later, are constituted by electrodes, which are formed by coating a transparent electrode, for example, indium-tin-oxide (ITO) or conductive polymer, on a transparent board, for example, glass or plastic. Thus, when voltages are supplied to the electrodes formed on the transparent board, charged particles can be easily attracted.

The relievo patterns 32 can be made from a flexible material using a polycarbonates (PC) film, a polyethylene terephthalate (PET) film, a polyethersulfone (PES) film or a polyimide film.

Moreover, the relievo patterns 32 can be made from a material selected from the group consisting of an epoxy system, a urethane system and a polyester system.

Figure 5:
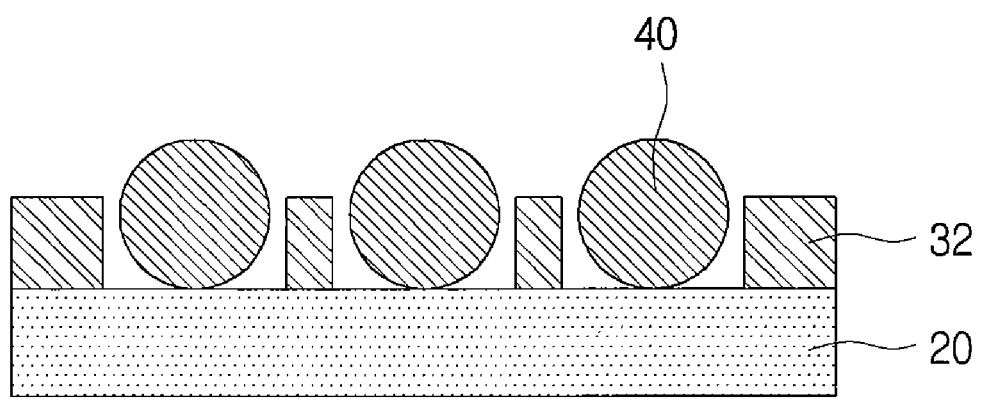

Next, as illustrated in FIG. 5, a plurality of display units can be disposed in between the relievo patterns 32 such that the display units are separated from one another. The display units, which are used for displaying black, white or other colors, are separated from one another by being disposed in cells that are divided by the relievo patterns 32. In this embodiment, capsules 40 are presented as the display units.

Each of the capsules 40 contains ink particles of a particular color that have a positive (+) or negative (−) charge, ink particles of a different color that have the opposite charge, and a transparent dielectric fluid. That is, the capsule 40 can include at least one kind of particles dispersed in a fluid liquid.

For example, if the (+) charged particles are black particles formed from carbon black, the (−) charged particles can be white particles formed from titanium oxide. Conversely, if the (+) charged particles are white particles formed from titanium oxide, the (−) charged particles can be black particles formed from carbon black.

Here, as illustrated in FIG. 5, if the heights of the capsules 40 are greater than the heights of the relievo patterns 32, the capsules 40 are protruded over the relievo patterns 32. Since the capsules 40 contain fluid liquid, for example, oil, the capsules 40 can be pressed down within the cells formed between the relievo patterns 32 over time, and such form can be maintained after the upper board 70, which will be described later, is stacked on top of the relievo patterns 32 and the capsules 40.

Figure 6:
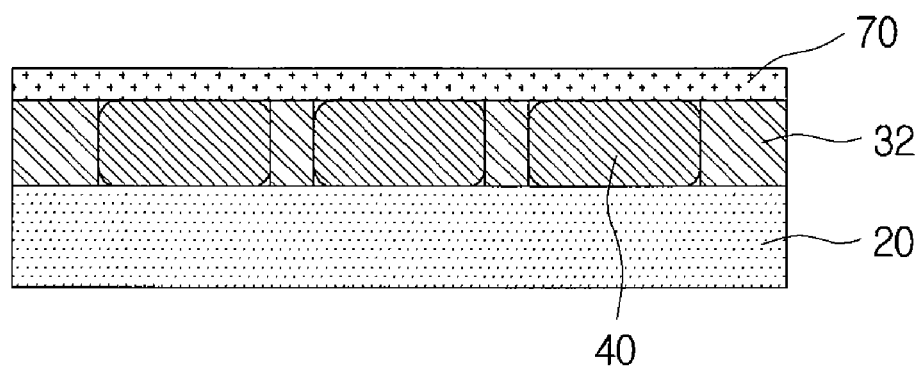
Figure 7:
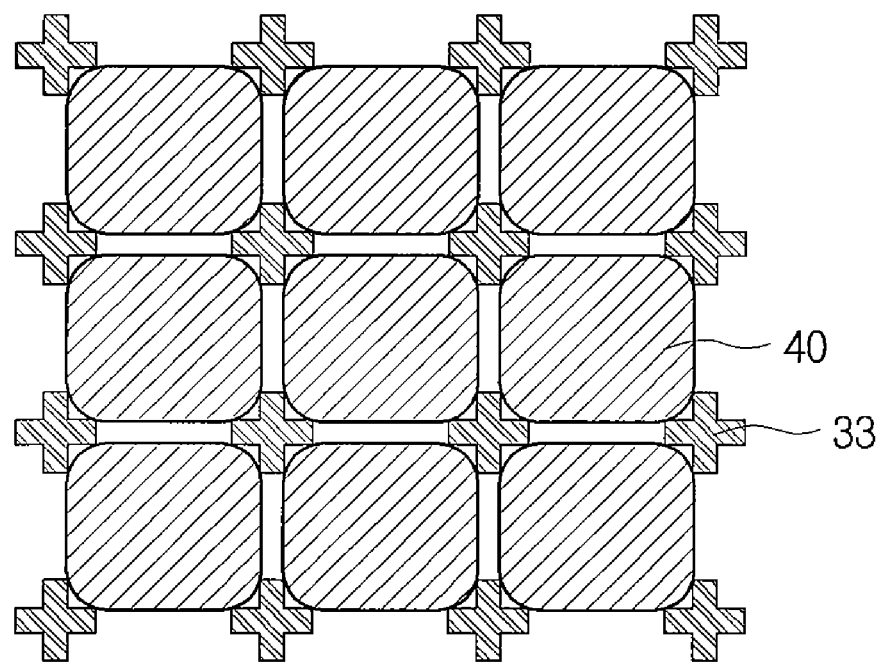
FIGS. 7 to 15 illustrate partition walls of an electronic paper display device in accordance with certain embodiments of the present invention.

Although FIGS. 5 and 6 illustrate an example in which one capsule 40 is placed inside a cell, it shall be apparent that the present invention is not limited to this example and that a plurality of capsules 40 can be placed inside a cell.

Next, as illustrated in FIG. 6, the upper board 70 can be coupled to the upper surface of the relievo patterns 32 and the capsules 40 such that the inner space of the cells can be filled with the capsules 40.

According to the method of manufacturing an electronic paper display in accordance with the present embodiment as set forth above, the relievo patterns 32, by which the display units are disposed, can be formed through an imprinting method, As a result, the space between the cells can be predetermined, the distance between the display units can be adjusted, and the quantity of disposed display units can be made uniform.

In an electronic paper display device, it is important that the filling ratio of capsules including a display device be increased and partition walls be fabricated efficiently. To this end, certain various embodiments of the partition walls of an electronic paper display device will be described below.

FIGS. 7 to 15 illustrate partition walls of an electronic paper display device in accordance with certain various embodiments of the present invention. First, in accordance with an embodiment illustrated in FIG. 7, relievo patterns 33 lie at four corners of each cell, in which a capsule 40 is placed, without completely surrounding the capsule 40. That is, cross-shaped partition walls, i.e., the relievo patterns 33, are formed at a minimum to fix the capsules 40 without having the capsules 40 touch one another.

In this embodiment, the partition walls 33 are formed where the capsules 40 are to be fixed only, not completely around the capsules 40, unlike the conventional method, and thus the capsules 40 can be arranged more easily than the conventional method. Moreover, since the partition walls 33 do not completely surround the capsules 40, the size of the partition walls 33 separating the capsules 40 from one another can be minimized, and thus the image quality of the electronic paper display device can be improved.

Furthermore, since the cross-shaped partition walls 33 are separated from one another, and do not completely surround the capsules 40, the stamp 10 can be easily separated from the resin layer 30 after fabricating the relievo patterns 33 using the imprinting method.

In the following embodiments of the partition wall of an electronic paper display device, the partition walls can be implemented in different shapes, but the effect is little different from the present embodiment.

Figure 8:
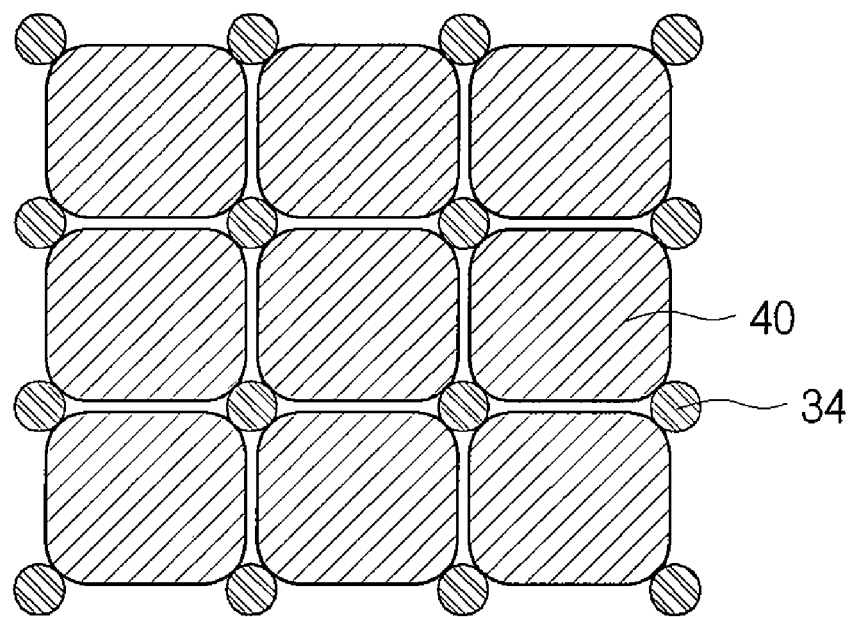

In an embodiment illustrated in FIG. 8, relievo patterns 34 with a circular cross-section are formed at four apexes of each cell, without surrounding the capsule 40 inside the cell.

Figure 9:
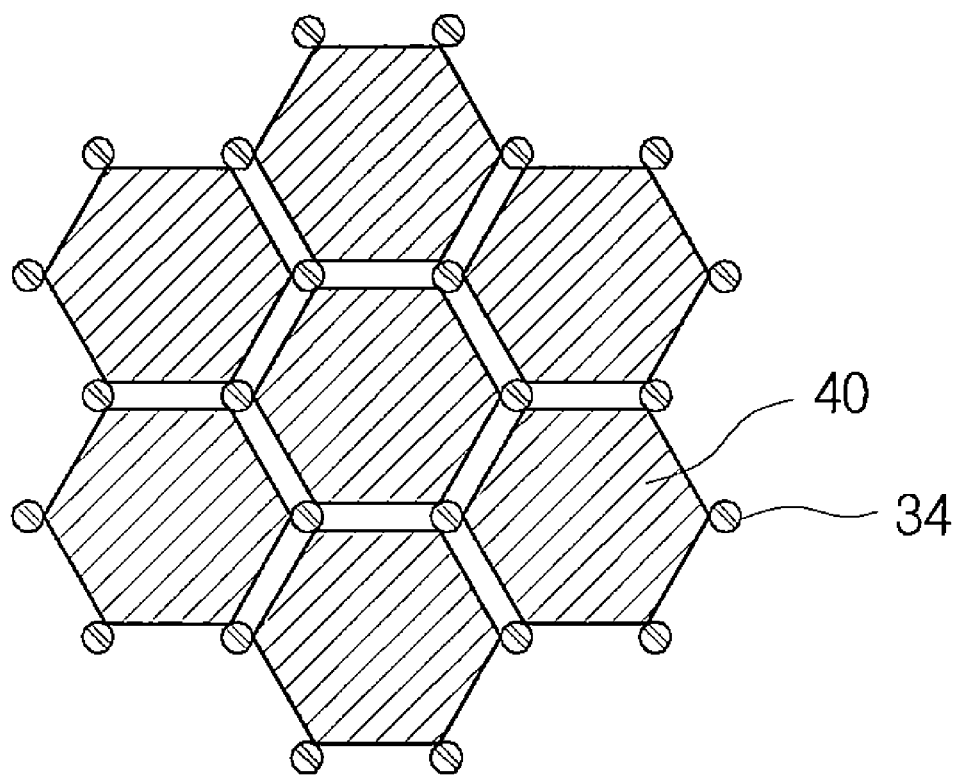

In an embodiment illustrated in FIG. 9, the capsules 40 are shaped like a hexagon, and partition walls, i.e., relievo patterns 34, with a circular cross-section are formed at each apex of the hexagon-shaped capsule.

Figure 10:
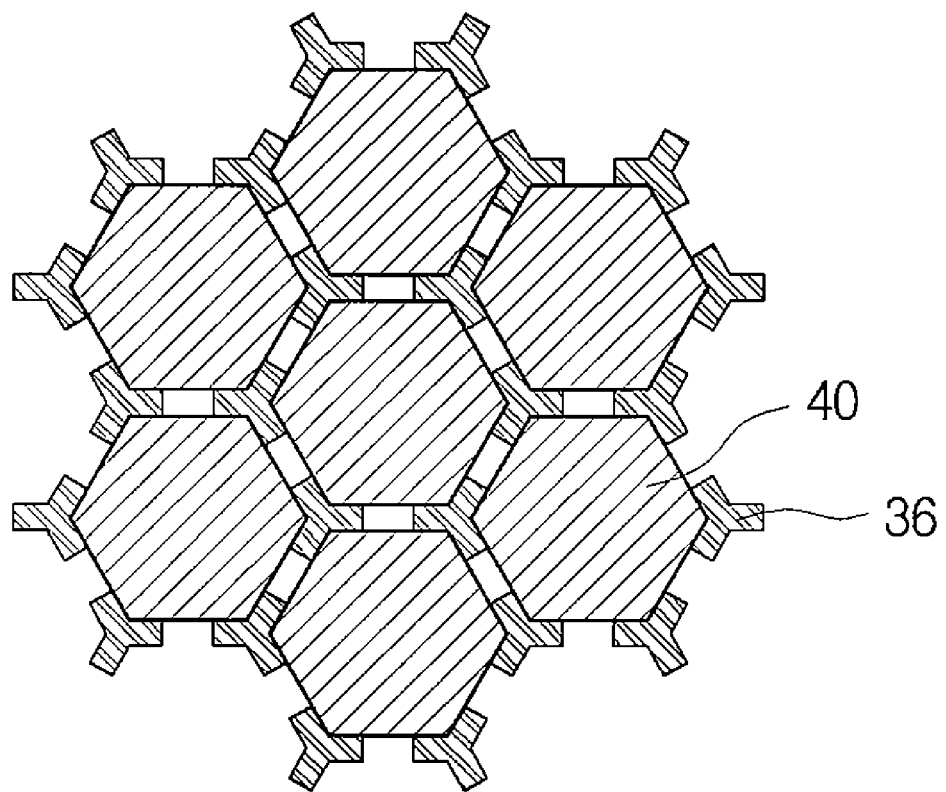

In an embodiment illustrated in FIG. 10, the capsules 40 are shaped like a hexagon, and partition walls, i.e., relievo patterns 36, with a Y-shaped cross-section are formed at each apex of the hexagon-shaped cross section so as to hold the capsules 40 in position. In this embodiment, the capsules 40 are shaped like a honeycomb, and the filling ratio of the capsules 40 can be maximized.

Figure 11:
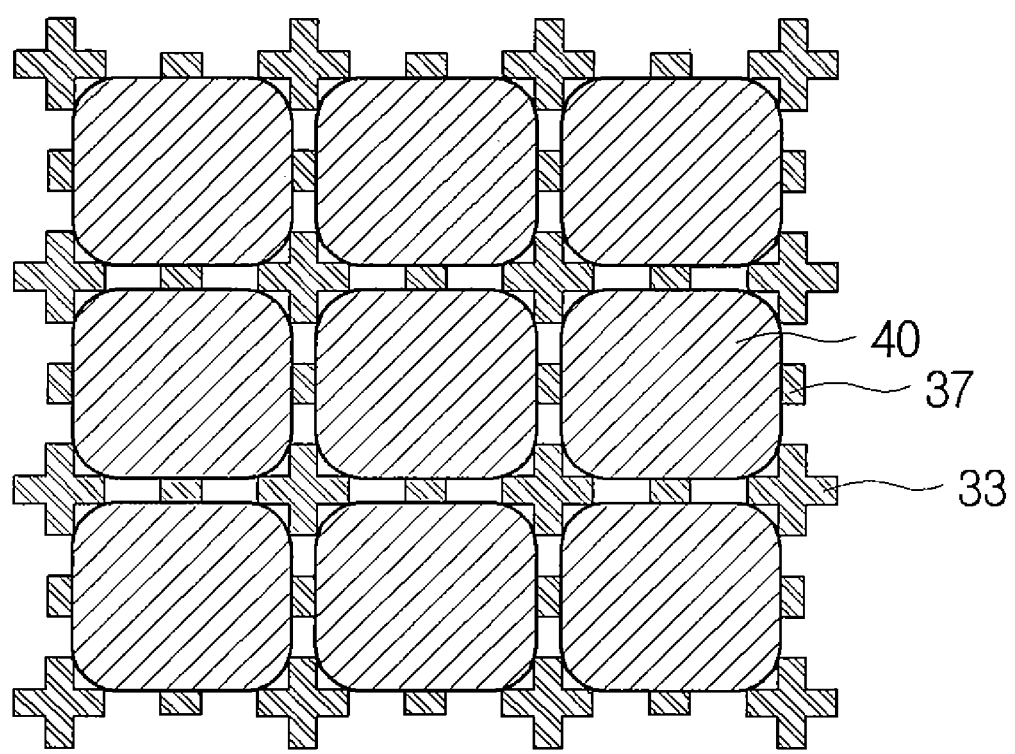

In an embodiment illustrated in FIG. 11, a combination of at least two types of partition walls holding the capsules 40 in position is presented. In this embodiment, an electronic paper display device including the partition walls 33 with a cross-shaped cross-section and partition walls 37 with a rectangular cross-section is disclosed as an example. That is, as illustrated in FIG. 11, the cross-shaped partition walls 33 lie at the apexes of each rectangular capsule 40, and the rectangular partition walls 37 lie at four sides where each side of adjacent capsules faces each other. While the present embodiment presents the partition walls 37 with a rectangular cross-section in addition to the partition walls 33 with a cross-shaped cross-section, it shall be apparent that the relievo patterns 34 with a circular cross-section can be also applied to this embodiment, as illustrated in FIG. 9.

Figure 12:
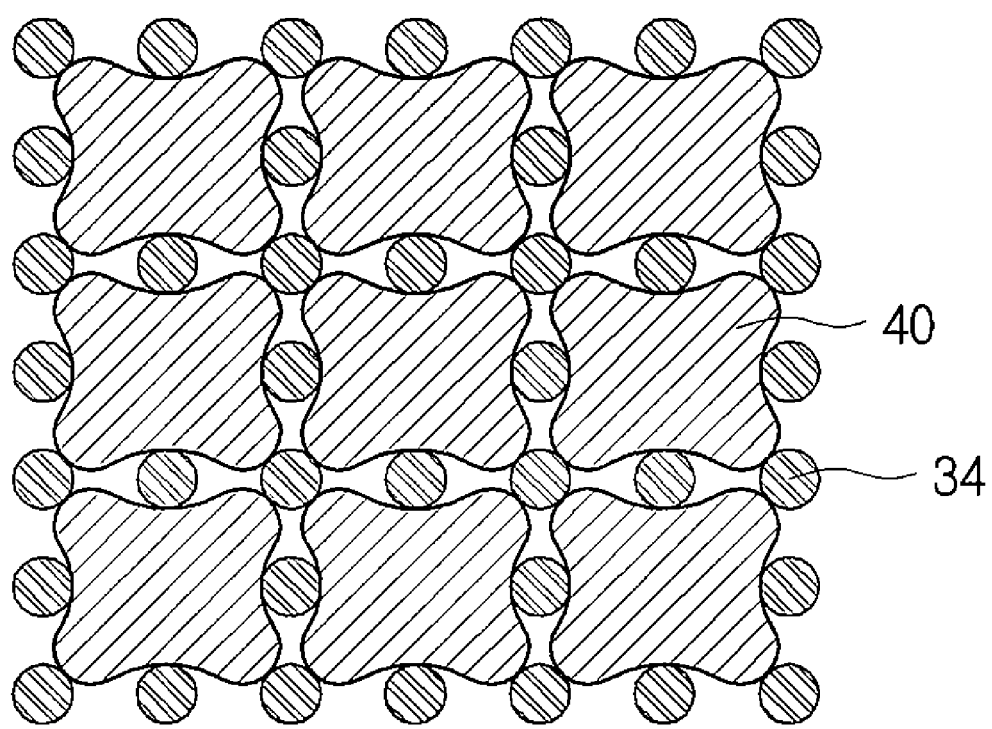

In an embodiment illustrated in FIG. 12, the capsules 40 are held in position by a plurality of circular-shaped partition walls 34, which are separated from one another, at the apexes and sides of each rectangular capsule 40.

Figure 13:
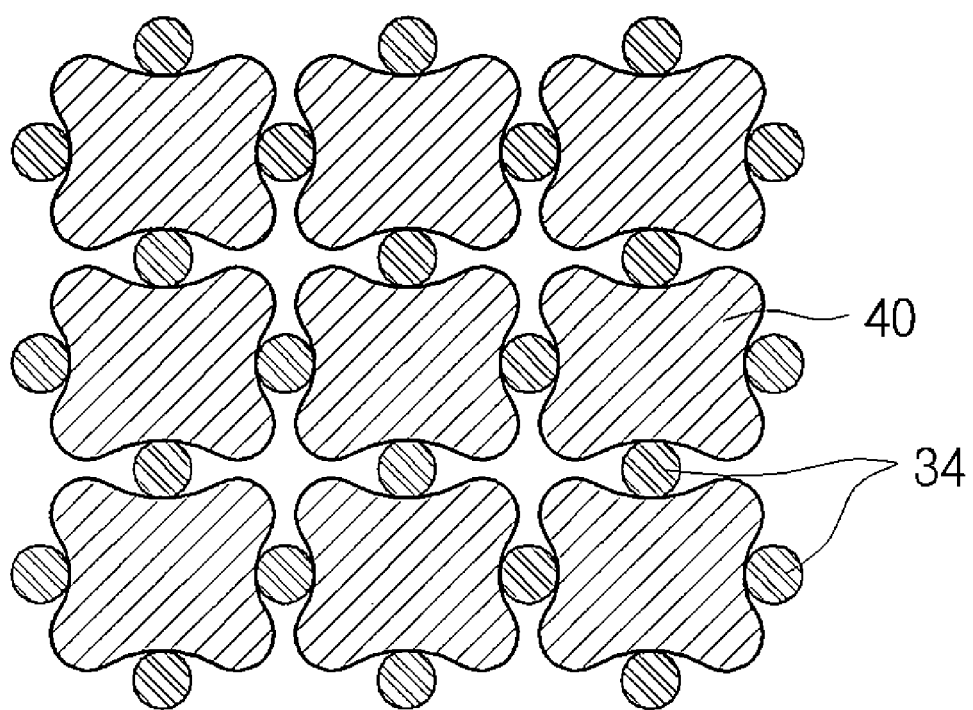

In an embodiment illustrated in FIG. 13, unlike the embodiment illustrated in FIG. 12, the plurality of circular-shaped partition walls 34, which are separated from one another, lie at the sides of each rectangular capsule 40, without the partition walls at the apexes of each rectangular capsule 40, to hold the capsule 40 in position.

Figure 14:
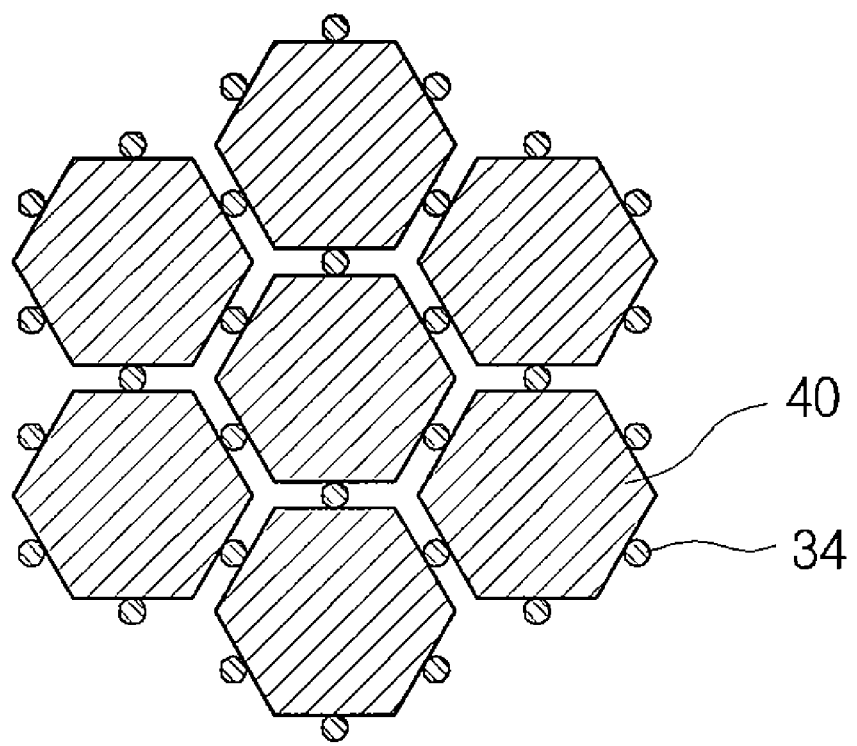

In an embodiment illustrated in FIG. 14, like the embodiment illustrated in FIG. 13, a plurality of circular-shaped partition walls 34, which are separated from one another, lie at the six sides of each hexagon-shaped capsule 40, without the partition walls at the apexes of each hexagon-shaped capsule 40, to hold the capsule 40 in position.

Figure 15:
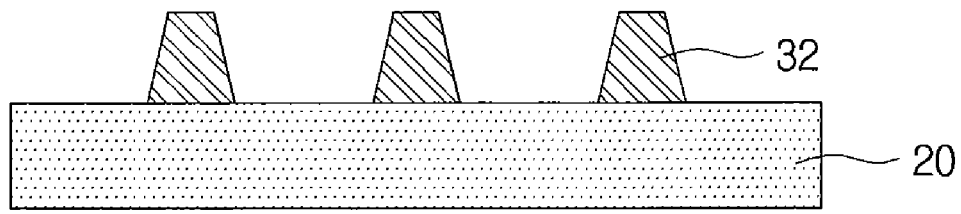

Meanwhile, FIG. 15 illustrates the cross section of partition walls. As illustrated in FIG. 15, the relievo patterns 32 formed on the lower board 20 can be formed in a shape with an inclination, instead of a vertically-upright shape, so as to improve the filling ratio of the capsule 40.

Furthermore, if the relievo patterns 32 are fabricated through an imprinting method using the stamp 10, the width between the cells can be made uniform, and the dispersion of operating voltage between the cells and the electric field gradient inside the cell can be minimized, producing an electronic paper that can implement an optimized speed of response.

According to the method of manufacturing an electronic paper display device in accordance with an embodiment of the present invention, a precise quantity of capsules can be injected into the cells, and thus the visual quality of display can be improved by removing blots or spots formed on a screen when operating the electronic paper.

Although certain various embodiments have been illustrated in FIGS. 7 to 15, these are merely some examples of the present invention, and it shall be apparent that a combination of the structures described above can be also employed.

Figure 16:
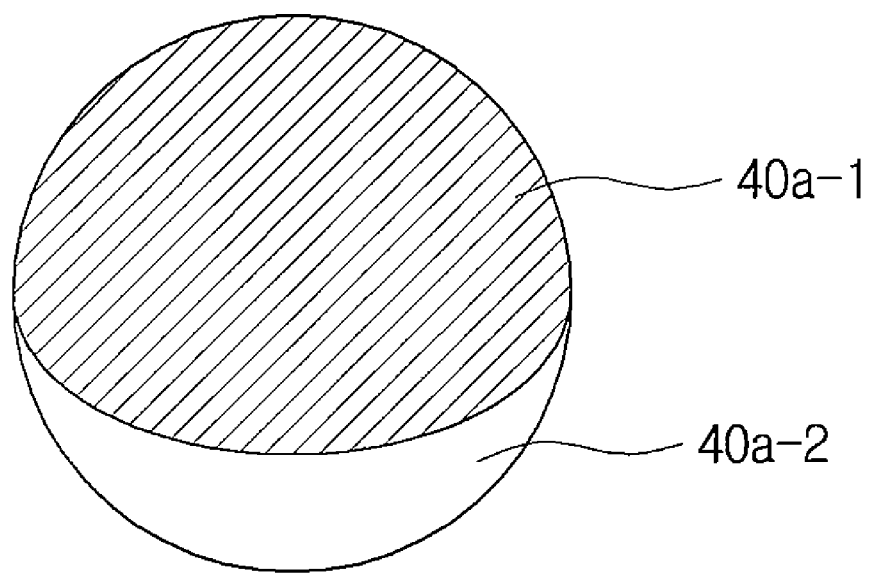
FIG. 16 is a perspective view illustrating a display unit in a spherical shape.
Figure 17:
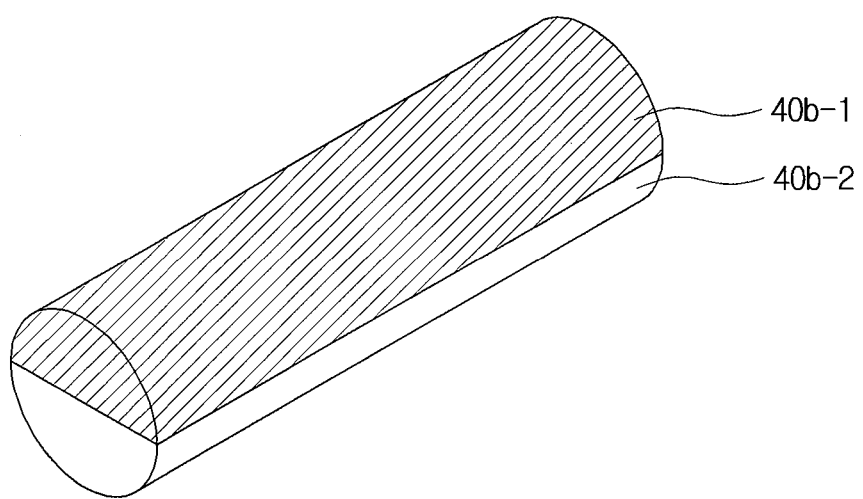
FIG. 17 is a perspective view illustrating a display unit in a cylindrical shape.

While the various embodiments described above have presented the capsules 40, i.e., the display units, including ink particles of a particular color that have a (+) or (−) charge, ink particles of a different color that have the opposite charge, and a transparent dielectric fluid, it shall be apparent that the present invention is not limited to the above description, and it shall be apparent that the present invention can encompass, for example, rotating bodies 40*a* and 40*b* having optical and electrical anisotropy as the display units, as illustrated in FIGS. 16 and 17.

One half of the rotating bodies 40*a* and 40*b* being used as the display units can be charged with (+), and the other half of the rotating bodies 40*a* and 40*b* can be charged with (−). Also, the rotating bodies 40*a* and 40*b* can be mixed with a material displaying black, white or other colors in such a way that the color of the rotating bodies 40*a* and 40*b* can be changed with a rotation. Such rotating bodies are rotated by the polarity of the electric field exerted from outside, and thus an image with black and white or other colors can be displayed. Moreover, a fluid can be coated on the surface of the rotating bodies such that the rotating bodies can be rotated more easily.

Illustrated in FIG. 16 is a spherical-shaped rotating body (i.e., a twist ball 40*a*), of which an upper portion 40*a*-1 has a black color and a lower portion 40*a*-2 has a white color. Illustrated in FIG. 17 is a cylinder-shaped rotating body 40*b*, of which an upper portion 40*b*-1 has a black color and a lower portion 40*b*-2 has a white color. However, the shape of the rotating bodies is not limited to the examples illustrated herein, and any shape can be possible as long as the color of the rotating bodies cab be changed with the rotation.

Figure 18:
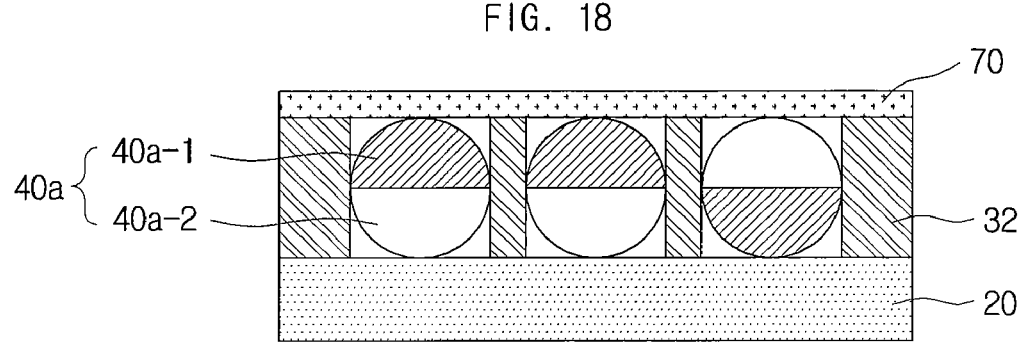
FIG. 18 is a cross-sectional view illustrating an electronic paper display device in which spherical shaped display units are arranged.

FIG. 18 is a cross-sectional view illustrating an electronic paper display device in which the spherical-shaped display units 40*a* are disposed. If the spherical-shaped rotating body 40*a*, or the cylinder-shaped rotating body 40*b*, is used as the display unit, the height of the relievo patterns 32 may need to be equal to or greater than the height of the display units 40*a* and 40*b*, considering that the display units may not be deformed smoothly.

While the spirit of the invention has been described in detail with reference to particular embodiments, the embodiments are for illustrative purposes only and shall not limit the invention. It is to be appreciated that those skilled in the art can change or modify the embodiments without departing from the scope and spirit of the invention. As such, many embodiments other than those set forth above can be found in the appended claims.

What is claimed is:

1. A method of manufacturing an electronic paper display device, the method comprising:
    forming a plurality of partition walls on a lower board, each of the plurality of partition walls formed to be independent and separated from one another;
    disposing a display unit in between the plurality of partition walls, wherein the plurality of partition walls are located to partially, but not completely, surround the display unit; and
    attaching an upper board on the plurality of partition walls such that the display unit is covered,
    wherein the display unit is a capsule comprising a positively-charged (+) particle and a negatively-charged (−) particle dispersed in a fluid liquid, or a rotating body having optical and electrical anisotropy.

2. The method of claim 1, wherein a height of the plurality of partition walls is smaller than a height of the capsule.

3. The method of claim 1, wherein one of the positively-charged (+) particle and negatively-charged (−) particle is a black particle made from carbon black and the other of the positively-charged (+) particle and negatively-charged (−) particle is a white particle made from titanium oxide.

4. The method of claim 1, wherein the forming of the plurality of partition walls comprises:
    stacking a resin layer on an upper surface of the lower board; and
    pressing a stamp on the resin layer, the stamp having intaglio patterns formed therein, the intaglio patterns corresponding to the partition walls.

5. The method of claim 1, wherein a cross section of each partition wall is any one of a cross shape, a Y shape, a rectangular shape and a circular shape.

6. The method of claim 1, wherein the plurality of partition walls are made of a material selected from a group consisting of polycarbonates (PC), polyethylene terephthalate (PET), polyethersulfone (PES), polyimide, an epoxy system, a urethane system and a polyester system.

7. The method of claim 1, wherein when the display unit is a rotating body, a height of the plurality of partition walls is equal to or greater than a height of the rotating body.

8. An electronic paper display device comprising:
    a lower board;
    a plurality of partition walls formed on the lower board, each of the plurality of partition walls formed to be independent and separated from one another;
    a display unit disposed in between the plurality of partition walls partially, but not completely, surrounding the display unit such that the display unit is separated from an adjacent display unit; and
    an upper board stacked on the plurality of partition walls such that the display unit is covered,
    wherein the display unit is a capsule comprising a positively-charged (+) particle and a negatively-charged (−) particle dispersed in a fluid liquid, or a rotating body having optical and electrical anisotropy.

9. The device of claim 8, wherein one of the positively-charged (+) particle and negatively-charged (−) particle is a black particle made from carbon black and the other of the positively-charged (+) particle and negatively-charged (−) particle is a white particle made from titanium oxide.

10. The device of claim 8, wherein a cross section of each partition wall is any one of a cross shape, a Y shape, a rectangular shape and a circular shape.

11. The device of claim 8, wherein the plurality of partition walls are made of a material selected from a group consisting of polycarbonates (PC), polyethylene terephthalate (PET), polyethersulfone (PES), polyimide, an epoxy system, a urethane system and a polyester system.

12. The device of claim 8, wherein when the display unit is a rotating body, a height of the plurality of partition walls is equal to or greater than a height of the rotating body.

* * * * *